(12) United States Patent
Steele, Jr.

(10) Patent No.: US 7,236,999 B2
(45) Date of Patent: Jun. 26, 2007

(54) METHODS AND SYSTEMS FOR COMPUTING THE QUOTIENT OF FLOATING-POINT INTERVALS

(75) Inventor: Guy L. Steele, Jr., Lexington, MA (US)

(73) Assignee: Sun Microsystems, Inc., Menlo Park, CA (US)

( * ) Notice: Subject to any disclaimer, the term of this patent is extended or adjusted under 35 U.S.C. 154(b) by 610 days.

(21) Appl. No.: 10/320,450

(22) Filed: Dec. 17, 2002

(65) Prior Publication Data

US 2004/0117420 A1     Jun. 17, 2004

(51) Int. Cl.
  G06F 7/38       (2006.01)
  G06F 7/44       (2006.01)
(52) U.S. Cl. .................................... 708/495; 708/504
(58) Field of Classification Search ................ 708/495, 708/504
  See application file for complete search history.

(56) References Cited

U.S. PATENT DOCUMENTS

| | | | |
|---|---|---|---|
| 3,725,649 A | 4/1973 | Deerfield | |
| 4,777,613 A | 10/1988 | Shahan et al. | |
| 4,788,655 A | 11/1988 | Nakayama et al. | |
| 4,991,131 A | 2/1991 | Yeh et al. | |
| 5,065,352 A | 11/1991 | Nakano | |
| 5,126,963 A | 6/1992 | Fukasawa | 364/748 |
| 5,161,117 A | 11/1992 | Waggener, Jr. | |
| 5,249,149 A | 9/1993 | Cocanougher et al. | |
| 5,307,303 A | 4/1994 | Briggs et al. | |
| 5,347,481 A | 9/1994 | Williams | 364/748 |
| 5,347,482 A | 9/1994 | Williams | 364/757 |
| 5,357,237 A | 10/1994 | Bearden et al. | |
| 5,363,321 A | 11/1994 | Dao Trong et al. | |
| 5,365,465 A | 11/1994 | Larson | |
| 5,481,489 A | 1/1996 | Yanagida et al. | |
| 5,570,310 A | 10/1996 | Smith | |
| 5,666,301 A | 9/1997 | Makino | |
| 5,748,516 A | 5/1998 | Goddard et al. | 364/748.03 |
| 5,812,439 A | 9/1998 | Hansen | |

(Continued)

OTHER PUBLICATIONS

Pending U.S. Appl. No. 10/035,747, filed Dec. 28, 2001, Steele, Jr.

(Continued)

*Primary Examiner*—Tan V. Mai
(74) *Attorney, Agent, or Firm*—Finnegan, Henderson, Farabow, Garrett & Dunner, L.L.P.

(57) ABSTRACT

Computing an output interval includes producing a first result from a conditional selection using a first operand, a second operand, and a third operand, the operands respectively including a second input interval upper-point, a first input interval upper-point, and a first input interval lower-point. Next, computing an output interval includes producing a second result from the conditional selection, the operands respectively including a second input interval upper-point, the first input interval upper-point, and the first input interval lower-point. Furthermore, computing an output interval includes producing a third result from a conditional division using the first operand, the second operand, and the third operand, the operands respectively including the first result, the second input interval upper-point, and the second input interval lower-point. And finally, a fourth result is produced from the conditional division, the operands respectively including the second result, the second input interval lower-point, and the second input interval upper-point.

26 Claims, 5 Drawing Sheets

U.S. PATENT DOCUMENTS

| | | | |
|---|---|---|---|
| 5,862,066 | A | 1/1999 | Rossin et al. |
| 5,892,697 | A | 4/1999 | Brakefield |
| 5,931,943 | A | 8/1999 | Orup |
| 5,953,241 | A | 9/1999 | Hansen et al. |
| 5,963,461 | A | 10/1999 | Gorshtein et al. |
| 5,978,901 | A | 11/1999 | Luedtke et al. |
| 5,995,991 | A | 11/1999 | Huang et al. ............. 708/495 |
| 6,009,511 | A | 12/1999 | Lynch et al. ............. 712/222 |
| 6,049,865 | A | 4/2000 | Smith |
| 6,081,823 | A * | 6/2000 | Purcell et al. ............. 708/629 |
| 6,105,047 | A | 8/2000 | Sharangpani et al. |
| 6,108,772 | A | 8/2000 | Sharangpani |
| 6,131,106 | A | 10/2000 | Steele, Jr. ............. 708/510 |
| 6,138,135 | A | 10/2000 | Karp |
| 6,151,669 | A | 11/2000 | Huck et al. |
| 6,189,094 | B1 | 2/2001 | Hinds et al. |
| 6,205,460 | B1 | 3/2001 | Steele, Jr. |
| 6,219,685 | B1 | 4/2001 | Story |
| 6,256,655 | B1 | 7/2001 | Ezer et al. |
| 6,286,023 | B1 * | 9/2001 | Purcell et al. ............. 708/620 |
| 6,286,024 | B1 * | 9/2001 | Yano et al. ............. 708/625 |
| 6,360,189 | B1 | 3/2002 | Hinds et al. |
| 6,393,555 | B1 | 5/2002 | Meier et al. |
| 6,490,607 | B1 | 12/2002 | Oberman |
| 6,571,265 | B1 | 5/2003 | Story |
| 6,697,832 | B1 | 5/2003 | Kelley et al. |
| 6,594,681 | B1 | 7/2003 | Prabhu |
| 6,629,120 | B1 | 9/2003 | Walster et al. |
| 6,658,443 | B1 | 12/2003 | Walster |
| 6,658,444 | B1 | 12/2003 | Walster et al. |
| 6,732,134 | B1 | 5/2004 | Rosenberg et al. |
| 6,789,098 | B1 | 9/2004 | Dijkstra |
| 2002/0194232 | A1 | 12/2002 | Walster |
| 2003/0033335 | A1 | 2/2003 | Walster |
| 2004/0117420 | A1 | 6/2004 | Steele, Jr. |
| 2004/0117421 | A1 | 6/2004 | Steele, Jr. |

OTHER PUBLICATIONS

Pending U.S. Appl. No. 10/035,595, filed Dec. 28, 2001, Steele, Jr.
Pending U.S. Appl. No. 10/035,584, filed Dec. 28, 2001, Steele, Jr.
Pending U.S. Appl. No. 10/035,579, filed Dec. 28, 2001, Steele, Jr.
Pending U.S. Appl. No. 10/035,589, filed Dec. 28, 2001, Steele, Jr.
Pending U.S. Appl. No. 10/035,587, filed Dec. 28, 2001, Steele, Jr.
Pending U.S. Appl. No. 10/035,583, filed Dec. 28, 2001, Steele, Jr.
Pending U.S. Appl. No. 10/035,746, filed Dec. 28, 2001, Steele, Jr.
Pending U.S. Appl. No. 10/035,741, filed Dec. 28, 2001, Steele, Jr.
Pending U.S. Appl. No. 10/035,586, filed Dec. 28, 2001, Steele, Jr.
Pending U.S. Appl. No. 10/028,375, filed Dec. 28, 2001, Steele, Jr.
Pending U.S. Appl. No. 10/035,585, filed Dec. 28, 2001, Steele, Jr.
Pending U.S. Appl. No. 10/035,582, filed Dec. 28, 2001, Steele, Jr.
Pending U.S. Appl. No. 10/035,674, filed Dec. 28, 2001, Steele, Jr.
Pending U.S. Appl. No. 10/035,581, filed Dec. 28, 2001, Steele, Jr.
Pending U.S. Appl. No. 10/035,647, filed Dec. 28, 2001, Steele, Jr.
Pending U.S. Appl. No. 10/036,133, filed Dec. 28, 2001, Steele, Jr.
Pending U.S. Appl. No. 10/035,580, filed Dec. 28, 2001, Steele, Jr.
Title: "Safe Treatment of Overflow and Underflow Conditions", by Robert A. Fraley & J. Stephen Walther, Hewlett-Packard Co., pp. 1-5.
Title: "Vax Floating Point: A Solid Foundation for Numerical Computation", by Mary Payne & Dileep Bhandarkar, Digital Equipment Corp., pp. 1-12.
Title: Lecture Notes on the Status of "IEEE Standard 754 for Binary Floating-Point Arithmetic", by Prof. W. Kahan, May 31, 1996, pp. 1-30.
Title: "Interval Arithmetic Specification" by Dmitri Chiriaev & G. William Walster, Draft revised May 4, 1998, pp. 1-78.
Title: "IEEE Standard for Binary Floating-Point Arithmetic IEEE Standard 754-1985," by Standards Committee of the IEEE Computer Society, The Institute of Electrical and Electronics Engineers, Inc., copyright 1985, pp. 1-14.

* cited by examiner

405

|       | -inf | -q   | -0   | +0   | +q   | +inf |
|-------|------|------|------|------|------|------|
| -inf  | +0   | +inf | +inf | -inf | -inf | -inf |
| -p    | +0   |      | +inf | -inf |      | -0   |
| -0    | +0   | +0   | +0   | -inf | -0   | -0   |
| +0    | -0   | -0   | -inf | +0   | +0   | +0   |
| +p    | -0   |      | -inf | +inf |      | +0   |
| +inf  | -inf | -inf | -inf | +inf | +inf | +0   |

|       | -inf | -q   | -0   | +0   | +q   | +inf |
|-------|------|------|------|------|------|------|
| -inf  | +inf | +inf | +inf | -inf | -inf | -0   |
| -p    | +0   |      | +inf | -inf |      | -0   |
| -0    | +0   | +0   | +inf | -0   | -0   | -0   |
| +0    | -0   | -0   | -0   | +inf | +0   | +0   |
| +p    | -0   |      | -inf | +inf |      | +0   |
| +inf  | -0   | -inf | -inf | +inf | +inf | +inf |

|      | -inf | -q   | -0   | +0   | +q   | +inf |
|------|------|------|------|------|------|------|
| -inf | -inf | +inf | -inf | -inf | -inf | -inf |
| -p   | +0   |      | -inf | -inf |      | -0   |
| -0   | +0   | +0   | -inf | -inf | -0   | -0   |
| +0   | -0   | -0   | -inf | inf  | +0   | +0   |
| +p   | -0   |      | -inf | -inf |      | +0   |
| +inf | -inf | -inf | -inf | -inf | +inf | -inf |

|      | -inf | -q   | -0   | +0   | +q   | +inf |
|------|------|------|------|------|------|------|
| -inf | +inf | +inf | +inf | +inf | -inf | +inf |
| -p   | +0   |      | +inf | +inf |      | -0   |
| -0   | +0   | +0   | +inf | +inf | -0   | -0   |
| +0   | -0   | -0   | +inf | +inf | +0   | +0   |
| +p   | -0   |      | +inf | +inf |      | +0   |
| +inf | +inf | -inf | +inf | +inf | +inf | +inf |

FIG. 7

METHODS AND SYSTEMS FOR COMPUTING THE QUOTIENT OF FLOATING-POINT INTERVALS

RELATED APPLICATION

U.S. patent application Ser. No. 10/320,547, filed on even date herewith in the name of Guy L. Steele Jr. and entitled "METHODS AND SYSTEMS FOR COMPUTING FLOATING-POINT INTERVALS," assigned to the assignee of the present application, is hereby incorporated by reference.

TECHNICAL FIELD

The present invention relates to the field of floating-point numbers. More particularly, the present invention, in various specific embodiments, involves methods and systems directed to computing the quotient of floating-point intervals.

BACKGROUND

Digital electronic devices, such as digital computers, calculators and other devices, perform arithmetic calculations on values in integer, or "fixed point," format, in fractional, or "floating point" format, or both. Institute of Electrical and Electronic Engineers (IEEE) Standard 754, (hereinafter "IEEE Std. 754" or "the Standard") published in 1985 and adopted by the American National Standards Institute (ANSI), defines several standard formats for expressing values in floating point format and a number of aspects regarding behavior of computation in connection therewith. In accordance with IEEE Std. 754, a representation in floating point format comprises a plurality of binary digits, or "bits," having the structure $$se_{msb} \ldots e_{lsb}f_{msb} \ldots f_{lsb}$$

where bit "s" is a sign bit indicating whether the entire value is positive or negative, bits "$e_{msb} \ldots e_{lsb}$" comprise an exponent field that represents the exponent "e" in unsigned binary biased format, and bits "$f_{msb} \ldots f_{lsb}$" comprise a fraction field that represents the fractional portion "f" in unsigned binary format ("msb" represents "most significant bit" and "lsb" represents "least significant bit"). The Standard defines two general formats. A "single" format comprises thirty-two bits while a "double" format comprises sixty-four bits. In the single format, there is one sign bit "s," eight bits "$e_7 \ldots e_0$" comprising the exponent field and twenty-three bits "$f_{22} \ldots f_0$" comprising the fraction field. In the double format, there is one sign bit "s," eleven bits "$e_{10} \ldots e_0$" comprising the exponent field and fifty-two bits "$f_{51} \ldots f_0$" comprising the fraction field.

As indicated above, the exponent field of the floating point representation "$e_{msb} \ldots e_{lsb}$" represents the exponent "E" in biased format. The biased format provides a mechanism by which the sign of the exponent is implicitly indicated. In particular, the bits "$e_{msb} \ldots e_{lsb}$" represent a binary encoded value "e" such that "e=E+bias." This allows the exponent E to extend from −126 to +127, in the eight-bit "single" format, and from −1022 to +1023 in the eleven-bit "double" format, and provides for relatively easy manipulation of the exponents in multiplication and division operations, in which the exponents are added and subtracted, respectively.

IEEE Std. 754 provides for several different formats with both the single and double formats which are generally based on the bit patterns of the bits "$e_{msb} \ldots e_{lsb}$" comprising the exponent field and the bits "$f_{msb} \ldots f_{lsb}$" comprising the fraction field. If a number is represented such that all of the bits "$e_{msb} \ldots e_{lsb}$" of the exponent field are binary ones (i.e., if the bits represent a binary-encoded value of "255" in the single format or "2047" in the double format) and all of the bits "$f_{msb} \ldots f_{lsb}$" of the fraction field are binary zeros, then the value of the number is positive or negative infinity, depending on the value of the sign bit "s." In particular, the value "v" is $v=(-1)^s\infty$, where "$\infty$" represents the value "infinity." On the other hand, if all of the bits "$e_{msb} \ldots e_{lsb}$" of the exponent field are binary ones and if the bits "$f_{msb} \ldots f_{lsb}$" of the fraction field are not all zeros, then the value that is represented is deemed "not a number," which is abbreviated in the Standard by "NaN."

If a number has an exponent field in which the bits "$e_{msb} \ldots e_{lsb}$" are neither all binary ones nor all binary zeros (i.e., if the bits represent a binary-encoded value between 1 and 254 in the single format or between 1 and 2046 in the double format), the number is said to be a "normalized" format. For a number in the normalized format, the value represented by the number is $v=(-1)^s 2^{e-bias}(1.|f_{msb} \ldots f \ldots {}_{lsb})$ where "|" represents a concatenation operation. Effectively, in the normalized format, there is an implicit most significant digit having the value "one," so that the twenty-three digits in the fraction field of the single format, or the fifty-two digits in the fraction field of the double format, will effectively represent a value having twenty-four digits or fifty-three digits of precision, respectively, where the value is less than two, but not less than one.

On the other hand, if a number has an exponent field in which the bits "$e_{msb} \ldots e_{lsb}$" are all binary zeros, representing the binary-encoded value of "zero," and a fraction field in which the bits $f_{msb} \ldots f_{lsb}$ are not all zero, the number is said to be a "de-normalized" format. For a number in the de-normalized format, the value represented by the number is $v=(-1)^s 2^{e-bias+1}(0.|f_{msb} \ldots f_{lsb})$. It will be appreciated that the range of values of numbers that can be expressed in the de-normalized format is disjointed from the range of values of numbers that can be expressed in the normalized format, for both the single and double formats. Finally, if a number has an exponent field in which the bits "$e_{msb} \ldots e_{lsb}$" are all binary zeros, representing the binary-encoded value of "zero," and a fraction field in which the bits $f_{msb} \ldots f_{lsb}$ are all zero, the number has the value "zero". It will be appreciated that the value zero may be positive zero or negative zero, depending on the value of the sign bit.

The discipline of interval arithmetic represents a range of values as a pair of numbers. For example, the interval [a,b] may represent the set of numbers x such that x is not less than a and b is not less than x:

$$[a,b]=\{x | a<=x<=b\}$$

Any numerical function f of one numerical argument is then extended to accept an interval as an argument by considering the set $$F=\{f(x) | a<=x<=b\}$$

and then defining $$f([a,b])=[p,q] \text{ where } p=\inf F \text{ and } q=\sup F$$

where "inf F" (also called the greatest lower bound of F) is the largest number that is not greater than any number in the set F, and "sup F" (also called the least upper bound of F) is the smallest number that is not less than any number in the set F. Thus, the result is the smallest possible interval that contains every possible result of applying f to some number in the argument interval.

Similarly, any numerical function g of two numerical arguments is extended to accept intervals as arguments by considering the set $G=\{g(x,y)|a<=x=b \text{ and } c<=y<=d\}$ and then defining $g([a,b], [c,d])=[p,q]$ where $p=\inf G$ and $q=\sup G$.

The result is the smallest possible interval that contains every possible result of applying g to two numbers such that the first number lies in the first argument interval and the second number lies in the second argument interval. It may be difficult in some cases to ascertain this result set precisely because of mathematical difficulty or limits on computational resources. Therefore, it may be acceptable to compute an approximation, [p',q'], to the true interval result such that $p'<=p$ and $q<=q'$, so that the approximate result interval completely contains the true result interval.

For certain very well behaved functions f and g, it is relatively easy to specify the true interval result in terms of the endpoints of the argument interval(s) without the need to refer to applications of f or g to all possible numerical values in the specified intervals.

For example, if f is "−," the negation operation, $-[a,b]=[-b,-a]$ and if g is the binary addition operation "+,"

$[a,b]+[c,d]=[a+c,b+d]$.

Similarly, if g is the binary subtraction operation "−,"

$[a,b]-[c,d]=[a-c,b-d]$.

If g is the binary multiplication operation "*,"

$[a,b]*[c,d]=[\min(a*c,a*d,b*c,b*d), \max(a*c,a*d,b*c,b*d)]$ where "min" is a function that returns a result equal to the smallest of its arguments and "max" is a function that returns a result equal to the largest of its arguments.

And if g is the binary division operation "/,"

$[a,b]/[c,d]=[\min(a/c,a/d,b/c,b/d), \max(a/c,a/d,b/c,b/d)]$, provided that either $c>0$ or $d<0$ (so that the divisor interval does not contain the value 0).

The theory of interval arithmetic is sometimes used as the basis of a computational discipline within digital computers. In particular, sometimes the endpoints "a" and "b" of an interval are represented as floating-point numbers, and (for example) sometimes these floating-point numbers are represented according to IEEE Std. 754 for Binary Floating-Point Arithmetic.

SUMMARY OF THE INVENTION

Consistent with the present invention, methods and systems for computing the quotient of floating-point intervals are provided that avoid problems associated with prior methods and systems for computing the quotient of floating-point intervals.

In one aspect, a method for computing an output interval comprises producing a first result from a conditional selection using a first operand, a second operand, and a third operand, the operands respectively including a second input interval lower-point, a first input interval lower-point, and a first input interval upper-point, producing a second result from the conditional selection using the first operand, the second operand, and the third operand, the operands respectively including a second input interval upper-point, the first input interval upper-point, and the first input interval lower-point, producing a third result from a conditional division using the first operand, the second operand, and the third operand, the operands respectively including the first result, the second input interval upper-point, and the second input interval lower-point, producing a fourth result from the conditional division using the first operand, the second operand, and the third operand, the operands respectively including the second result, the second input interval lower-point, and the second input interval upper-point, and producing the output interval including an output interval lower-point and an output interval upper-point, the output interval lower-point comprising the third result and the output interval upper-point comprising the fourth result.

In another aspect, a system for computing an output interval comprises a component for producing a first result from a conditional selection using a first operand, a second operand, and a third operand, the operands respectively including a second input interval lower-point, a first input interval lower-point, and a first input interval upper-point, a component for producing a second result from the conditional selection using the first operand, the second operand, and the third operand, the operands respectively including a second input interval upper-point, the first input interval upper-point, and the first input interval lower-point, a component for producing a third result from a conditional division using the first operand, the second operand, and the third operand, the operands respectively including the first result, the second input interval upper-point, and the second input interval lower-point, a component for producing a fourth result from the conditional division using the first operand, the second operand, and the third operand, the operands respectively including the second result, the second input interval lower-point, and the second input interval upper-point, and a component for producing the output interval including an output interval lower-point and an output interval upper-point, the output interval lower-point comprising the third result and the output interval upper-point comprising the fourth result.

In yet another aspect, a computer-readable medium on which is stored a set of instructions for computing an output interval, which when executed perform stages comprising producing a first result from a conditional selection using a first operand, a second operand, and a third operand, the operands respectively including a second input interval lower-point, a first input interval lower-point, and a first input interval upper-point, producing a second result from the conditional selection using the first operand, the second operand, and the third operand, the operands respectively including a second input interval lower-point, the first input interval lower-point, and the first input interval upper-point, producing a third result from a conditional division using the first operand, the second operand, and the third operand, the operands respectively including the first result, the second input interval lower-point, and the second input interval upper-point, producing a fourth result from the conditional division using the first operand, the second operand, and the third operand, the operands respectively including the second result, the second input interval upper-point, and the second input interval lower-point, and producing the output interval including an output interval upper-point and an output interval lower-point, the output interval upper-point comprising the third result and the output interval lower-point comprising the fourth result.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings:

FIG. 4 illustrates a first table of special cases involving zero or infinity consistent with an embodiment of the present invention;

FIG. 5 illustrates a second table of special cases involving zero or infinity consistent with an embodiment of the present invention;

FIG. 6 illustrates a third table of special cases involving zero or infinity consistent with an embodiment of the present invention; and FIG. 7 illustrates a fourth table of special cases involving zero or infinity consistent with an embodiment of the present invention.

DETAILED DESCRIPTION

Figure 1:
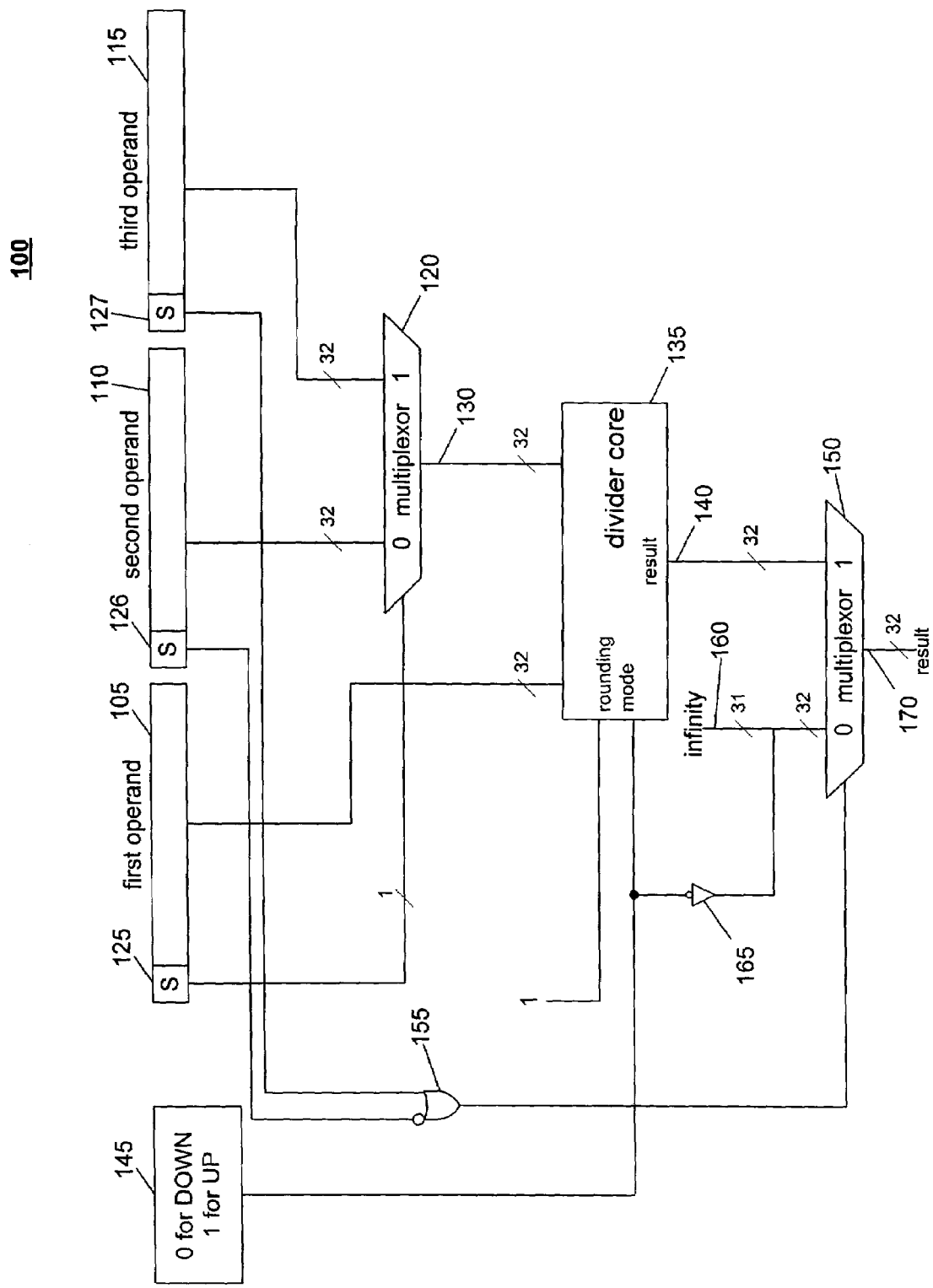
FIG. 1 is a functional block diagram of a system for computing an output interval consistent with an embodiment of the present invention.

Reference will now be made to various embodiments according to this invention, examples of which are shown in the accompanying drawings and will be obvious from the description of the invention. In the drawings, the same reference numbers represent the same or similar elements in the different drawings whenever possible.

A floating-point number format may not represent all possible real numbers; therefore, it may not be possible to represent all possible intervals in interval arithmetic. For example, the mathematical values ⅓ and ⅔ may not be represented exactly as a binary floating-point number, so it may not be possible to represent the interval [⅓, ⅔] using binary floating-point numbers. (Such an interval would be the mathematical result of dividing the interval [1, 2] by the interval [3, 3], for example, and those two example intervals can be represented exactly using floating-point numbers.) Therefore, such a computational discipline may rely on approximations. If the result of the division ⅓ is "rounded down" to a floating-point number t that is less than ⅓ in value, and the result of the division ⅔ is "rounded up" to a floating-point number u that is greater than ⅔ in value, then a digital computer may deliver the interval [t, u] as the result of dividing [1, 2] by [3, 3]. The interval [t, u] will contain the interval [⅓, ⅔], so this result may be considered acceptable for many computational purposes. In practice, t may be chosen to be the largest possible floating-point number that is not greater than ⅓ and u may be chosen to be the smallest possible floating-point number that is not less than ⅔, so that [t, u] may be as good an approximation as possible to the true mathematical interval result [⅓, ⅔].

IEEE Std. 754 provides for rounding the results of arithmetic operations either up or down on request. While IEEE Std. 754 calls for specifying the rounding through "rounding mode" information stored in a separate register, the direction of rounding may be specified as part of the instruction operation code.

For computational purposes, the formulas for four binary arithmetic operations may be implemented as follows:

$[a,b]+[c,d]=[\text{down}(a+c), \text{up}(b+d)]$ $[a,b]-[c,d]=[\text{down}(a-c), \text{up}(b-d)]$ $[a,b]*[c,d]=[\min(\text{down}(a*c), \text{down}(a*d), \text{down}(b*c), \text{down}(b*d)), \max(\text{up}(a*c), \text{up}(a*d), \text{up}(b*c), \text{up}(b*d))]$ $[a,b]/[c,d]=[\min(\text{down}(a/c), \text{down}(a/d), \text{down}(b/c), \text{down}(b/d)), \max(\text{up}(a/c), \text{up}(a/d), \text{up}(b/c), \text{up}(b/d))]$ where "down" indicates that the result r of an arithmetic operation is to be rounded down to the largest representable floating-point value that is not larger than r, and "up" indicates that the result r of an arithmetic operation is to be rounded up to the smallest representable floating-point value that is not less than r.

In the above computational scheme, while addition or subtraction of intervals is only approximately twice as expensive as addition or subtraction of single floating-point numbers, multiplication or division, using the formulas shown above, is more than eight times as expensive. This is because eight multiplications or divisions may be needed in the general case, in addition to the min and max operations.

A case analysis may be performed on the signs of the endpoints of the interval arguments. If each endpoint of an interval is replaced by its sign, + or −, then there are three possibilities: [−,−],[−,+], and [+,+]. For a binary operation such as division, there are then three possibilities for each argument, or nine in all. It is then possible to prove for each of the nine cases that certain of the operands to the min operation may not be the smallest, and that certain operands to the max operation may not be the largest. As a result a different formula can be used for each of the nine cases:

| [a, b] | [c, d] | result |
|---|---|---|
| [+, +] | [+, +] | [down (a/d), up (b/c)] |
| [+, +] | [−, +] | forbidden because 0 lies in [c, d] |
| [+, +] | [−, −] | [down (b/d), up (a/c)] |
| [−, +] | [+, +] | [down (a/c), up (b/c)] |
| [−, +] | [−, +] | forbidden because 0 lies in [c, d] |
| [−, +] | [−, −] | [down (b/d), up (a/d)] |
| [−, −] | [+, +] | [down (a/c), up (b/d)] |
| [−, −] | [−, +] | forbidden because 0 lies in [c, d] |
| [−, −] | [−, −] | [down (b/c), up (a/d)] |

The above case analysis may be expressed in software as a set of nested if-then-else statements that cause one of nine formulas to be chosen and executed. This has the advantage that, at most, two divisions may need to be executed rather than eight. But the complexity of the case analysis may discourage hardware implementations of this strategy. Also, with the case analysis possibly including multiple conditional branches, implementation may be time-consuming in software, especially on contemporary pipelined microprocessors that rely on branch prediction for good performance. In current RISC microprocessor designs it is not conventional to allow a single instruction to accept four distinct floating-point operands or to generate more than one floating-point result. Most instructions accept only two floating-point operands and a limited number of instructions accept three floating-point operands at the most. It is rare to allow a single instruction to deliver a result to more than one floating-point register. (This may stem from the costs associated with providing a register file with multiple read ports and write ports.)

IEEE 754–1985 provides representations for positive and negative zero and for positive and negative infinity. When these values are used as endpoints of an interval, they may be interpreted in more than one way, according to whether the signs of zeroes are regarded as significant. This may be important when a zero is divided by a zero or when an infinity is divided by an infinity.

For example, positive zero divided by positive zero may be regarded as potentially: 1) producing any real value as its result; or 2) as producing only a value with a positive sign. In the first case, rounding the result of positive zero divided by positive zero down should produce minus infinity, and rounding the result up should produce positive infinity. In the second case, rounding the result of positive zero divided by positive zero down should produce positive zero, and rounding the result up should produce positive infinity.

Given representations for positive and negative infinity, it is reasonable that the result of dividing [a,b] by [c,d] when c has sign "−" and d has sign "+" may be [−infinity,+infinity], which is an interval representing, in effect, the entire set of real This gives the following table of results:

| [a, b] | [c, d] | result |
| --- | --- | --- |
| [+, +] | [+, +] | [down (a/d), up (b/c)] |
| [+, +] | [−, +] | [−infinity, +infinity] |
| [+, +] | [−, −] | [down (b/d), up (a/c)] |
| [−, +] | [+, +] | [down (a/c), up (b/c)] |
| [−, +] | [−, +] | [−infinity, +infinity] |
| [−, +] | [−, −] | [down (b/d), up (a/d)] |
| [−, −] | [+, +] | [down (a/c), up (b/d)] |
| [−, −] | [−, +] | [−infinity, +infinity] |
| [−, −] | [−, −] | [down (b/c), up (a/d)] |

IEEE 754-1985 specifies that when a zero is divided by a zero or an infinity by an infinity, the result should be a NaN (Not A Number) value, which is not appropriate for use as the endpoint of an interval. Therefore, implementations of interval arithmetic may handle the cases of zero divided by zero and infinity divided by infinity through special-case checks in software. A divider circuit that rounds up or down the result of dividing zero by zero or infinity by infinity to produce a result appropriate to interval arithmetic when the signs of zeroes are regarded as significant is disclosed and described U.S. patent application Ser. No. 10/035,647, entitled "FLOATING-POINT DIVIDER THAT DELIVERS STATUS FLAG INFORMATION IN THE NUMERICAL RESULT", which is hereby incorporated by reference.

Consistent with the general principles of the present invention, a system for computing an output interval comprises a component for producing a first result from a conditional selection using a first operand, a second operand, and a third operand, the operands respectively including a second input interval lower-point, a first input interval lower-point, and a first input interval upper-point, a component for producing a second result from the conditional selection using the first operand, the second operand, and the third operand, the operands respectively including a second input interval upper-point, the first input interval upper-point, and the first input interval lower-point, a component for producing a third result from a conditional division using the first operand, the second operand, and the third operand, the operands respectively including the first result, the second input interval upper-point, and the second input interval lower-point, a component for producing a fourth result from the conditional division using the first operand, the second operand, and the third operand, the operands respectively including the second result, the second input interval lower-point, and the second input interval upper-point, and a component for producing the output interval including an output interval lower-point and an output interval upper-point, the output interval lower-point comprising the third result and the output interval upper-point comprising the fourth result.

The component for producing the first result, the component for producing the second result, the component for producing the third result, the component for producing the fourth result, and the component for producing the output interval may comprise elements of, be disposed within, or may otherwise be utilized by or embodied within one or more of the following: a mobile phone, a personal computer, a hand-held computing device, a multiprocessor system, microprocessor-based or programmable consumer electronic device, a minicomputer, a mainframe computer, a personal digital assistant (PDA), a facsimile machine, a telephone, a pager, a portable computer, or any other device that may receive, transmit, and/or process information. The above list of devices is exemplary and the component for producing the first result, the component for producing the second result, the component for producing the third result, the component for producing the fourth result, and the component for producing the output interval may comprise elements of, be disposed within, or may otherwise be utilized by or embodied within many other devices or system without departing from the scope and spirit of the invention.

Moreover, embodiments of the invention may be practiced in electrical circuits comprising discrete electronic elements, packaged or integrated electronic chips containing logic gates, circuits utilizing microprocessors, or on a single chip containing electronic elements or microprocessors. Furthermore, embodiments of the invention may be provided using other technologies capable of performing logical operations such as, for example, AND, OR, and NOT, including but not limited to mechanical, optical, fluidic, and quantum technologies. In addition, the invention may be practiced within a general purpose computer, may be implemented in software either as part of a runtime library routine or software generated by an otherwise conventional compiler, or in any other circuits or systems.

As herein embodied and illustrated in FIG. 1, the system for computing the output interval may comprise an output interval computing system 100. The following description of output interval computing system 100 is exemplary and many other configurations may be employed. System 100 may include a first operand register 105 for receiving a first operand, a second operand register 110 for receiving a second operand, and a third operand register 115 for receiving a third operand. Operand registers 105, 110, and 115 receive and store respective operands and may comprise, for example, a set of registers in a conventional manner.

In addition to operand registers 105, 110, and 115, system 100 may include a first multi-bit multiplexer 120 configured to receive the output of second operand register 110, third operand register 115, and a sign bit 125 of first operand register 105. Once input is received, first multiplexer 120 is configured to place on a first multiplexer output 130, either the output of second operand register 110 or the output of third operand register 115, based upon sign bit 125. For example, if sign bit 125 comprises a digital "0", first multiplexer 120 may place the output of second operand register 110 on first multiplexer output 130. If sign bit 125 comprises a digital "1", however, first multiplexer 120 may place the output of third operand register 115 on first multiplexer output 130.

System 100 also includes a divider core 135 configured to receive first multiplexer output 130, the output of first operand register 105, and a rounding mode indicator 145. Divider core 135 generates a quotient of first multiplexer output 130 and the output of first operand register 105 as a quotient result 140. Divider core 135 may generate this quotient in accordance with IEEE Std. 754. Furthermore, quotient result 140 may be rounded up or rounded down by divider core 135 depending upon the status of rounding mode indicator 145. For example, if the output of mode indicator 145 indicates a digital "0", the divider core 135 may round down. If the output of mode indicator 145 indicates a digital "1", the divider core 135 may round up.

Furthermore, system 100 may include a second multiplexer 150. Second multiplexer 150 receives quotient result 140, the output of a logic gate 155, and an infinity input 160. Second multiplexer 150 may produce a second multiplexer output 170 that may comprise either quotient result 140 or infinity input 160 based upon the output of logic gate 155. Moreover, infinity input 160 may include a sign bit based upon the output of inverter 165. Specifically, if a sign bit 126 of second operand register 110 indicates a negative sign and a sign bit 127 of third operand register 115 indicates a positive sign, the output of logic gate 155 may produce a signal configured to cause second multiplexer 150 to place infinity input 160 on second multiplexer output 170, for example. In addition, if rounding mode indicator 145 indicates the rounding down mode, inverter 165 may cause infinity input 160 to have a negative sign. Similarly, if rounding mode indicator 145 indicates the rounding up mode, inverter 165 may cause infinity input 160 to have a positive sign. If sign bits 126 and 127 comprise any combination other than negative and positive respectively, quotient result 140 may be placed on second multiplexer output 170.

Although not illustrated in FIG. 1, system 100 may include other elements configured to handle special cases involving the division of zero or infinity in a manner illustrated in tables 405, 505, 605, and 705 of FIGS. 4–7, respectively. For example, if the output of first operand register 105 or first multiplexer output 130 comprises $-\infty$, $+\infty$, $+0$, or $-0$, quotient result 140 may comprise a value as indicated in FIGS. 4–7. The elements of system 100 configured to handle special cases involving the division of zero or infinity, for example, may comprise a decision logic table. The decision logic table may be implemented using many different circuit elements including, but not limited to, programmable logic arrays, ASIC circuits, general memory registers, other addressable memory storage devices, or combinations thereof. The aforementioned elements are exemplary and many other elements or configurations may be employed. Moreover, special cases involving the quotient of zero or infinity may be processes using computer software including, for example, a runtime library routine or software generated by a compiler.

FIG. 4 illustrates the special case where the quotient result is rounded down with the signs of zeros treated as significant. FIG. 5 illustrates the special case where the quotient result is rounded up with the signs of zeros treated as significant. FIG. 6 illustrates the special case where the quotient result is rounded down with the signs of zeros not treated as significant. FIG. 7 illustrates the special case where the quotient result is rounded up with the signs of zeros not treated as significant. As shown in table 405 of FIG. 4, for example, if the dividend comprises +inf (plus infinity or $+\infty$) as shown in column 410, and the divisor comprises $-0$ as shown in row 415, the quotient result may comprise $-$inf (minus infinity or $-\infty$). Similarly, as shown in table 705 of FIG. 7, for example, if the dividend comprises a negative number ($-p$) as shown in column 710, and the divisor comprises $-0$ as shown in row 415, the quotient result may comprise +inf (plus infinity or $+\infty$). Tables 505 and 605, of FIGS. 5 and 6 respectively, may be utilized in a similar manner.

FIG. 1 illustrates an embodiment that uses a 32-bit representation for floating-point numbers. This 32-bit representation is exemplary and other representations may be employed including, but not limited to, a 64-bit representation.

Figure 2:
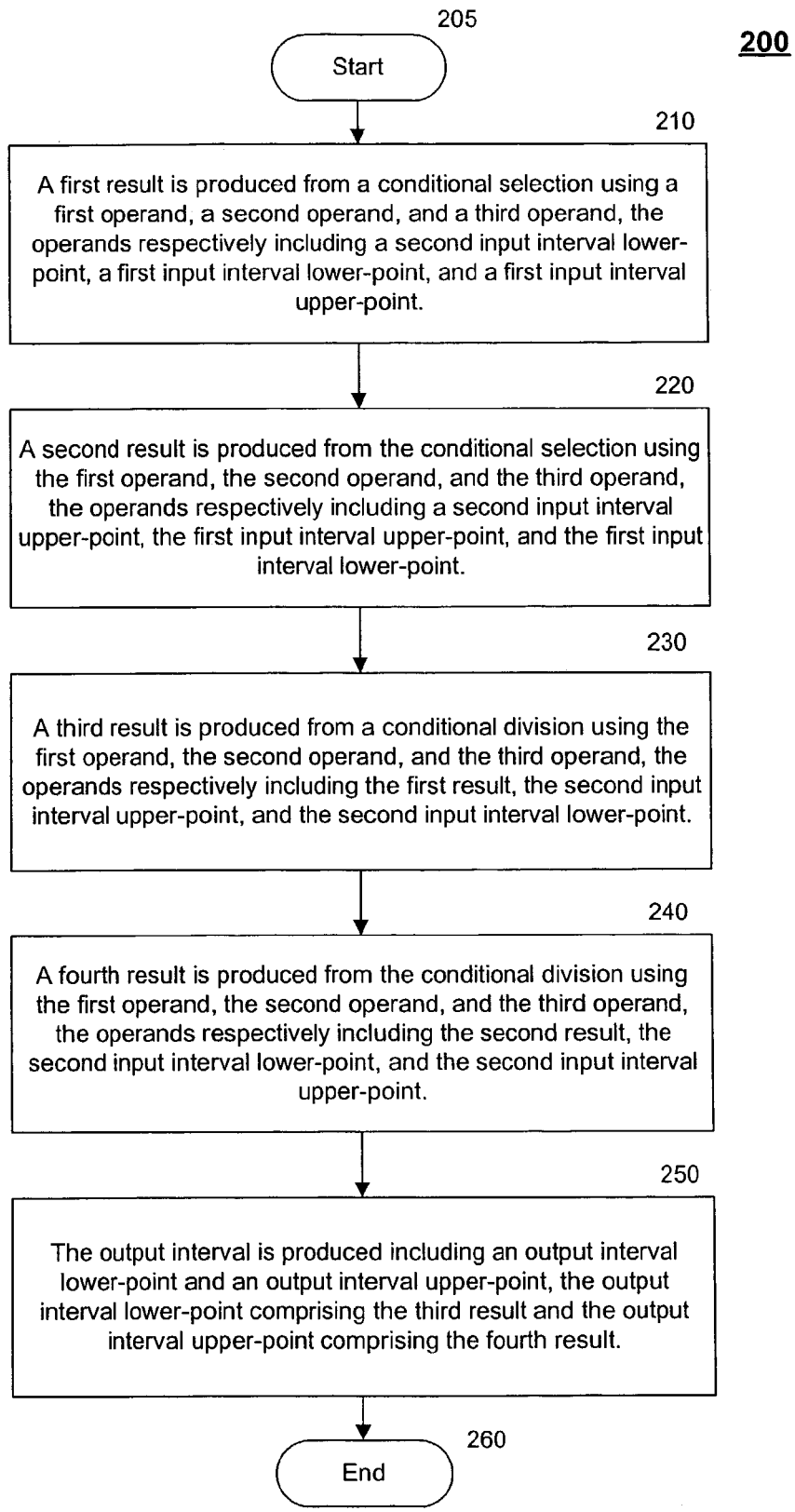
FIG. 2 is a flow chart of an exemplary method for computing an output interval consistent with an embodiment of the present invention.

FIG. 2 is a flow chart setting forth the general stages involved in an exemplary method for computing an output interval consistent with an embodiment of the present invention. The implementation of the stages of exemplary method 200 in accordance with an exemplary embodiment of the present invention will be described in detail below.

The division of an interval may be described as follows:

$$[a,b]/[c,d]=[e,f]$$

In the above equation, a and b may be described as a first input interval lower-point and a first input interval upper-point respectively, c and d may be described as a second input interval lower-point and a second input interval upper-point respectively, and e and f may be described as an output interval lower-point and an output interval upper-point respectively.

Figure 3:
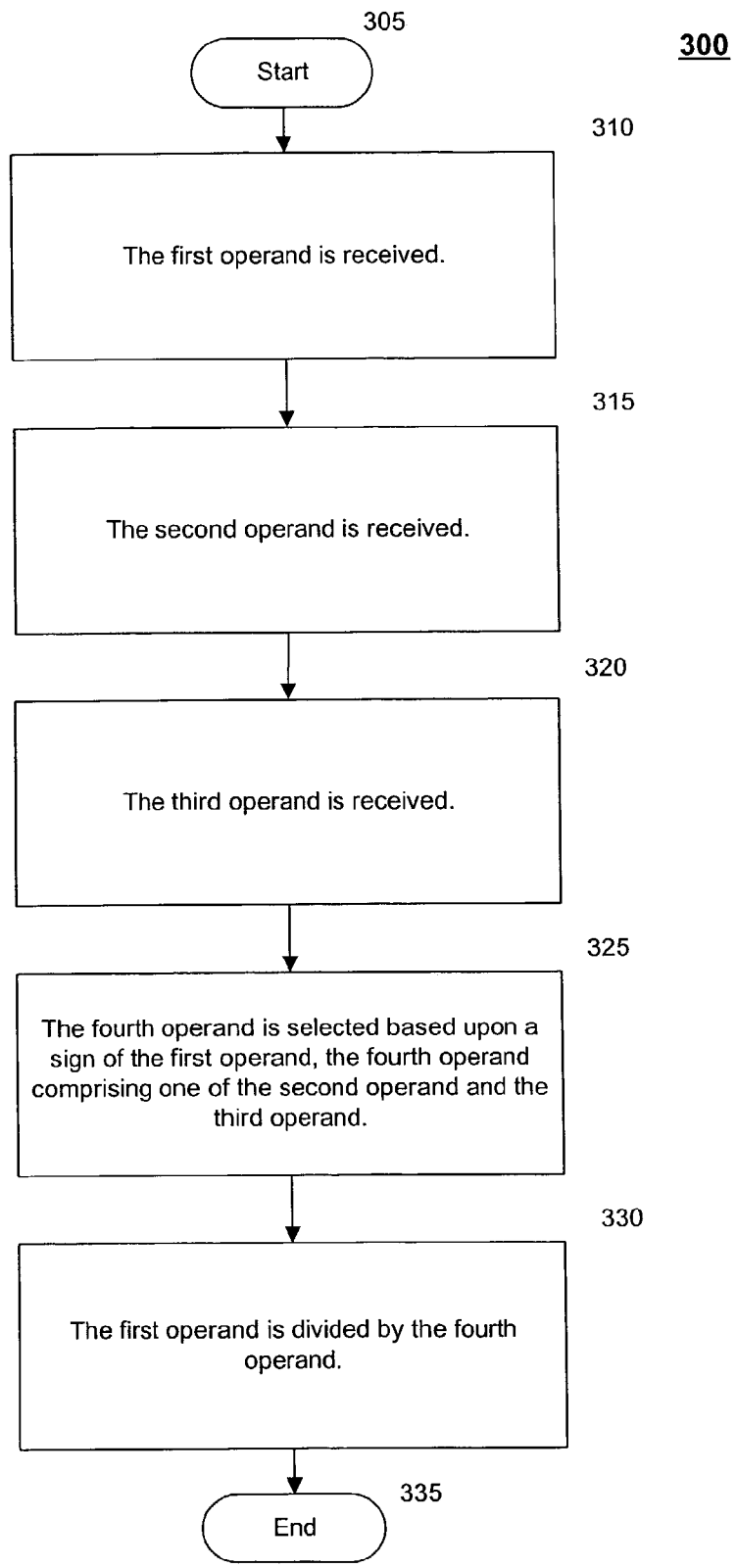
FIG. 3 is a flow chart of an exemplary method for producing at least one of the third result and the fourth result consistent with an embodiment of the present invention.

Exemplary method 200 begins at starting block 205 and proceeds to stage 210 where a first result is produced from a conditional selection using a first operand, a second operand, and a third operand. In this case the operands may respectively include the second input interval lower-point, the first input interval lower-point, and the first input interval upper-point. For example, the conditional selection used to produce the first result may be accomplished by stages 310 through 325 of exemplary method 300 as shown in FIG. 3 and described below. In this example, the first result may comprise the fourth operand of stage 325.

Once the first result is produced from a conditional selection using the first operand, the second operand, and the third operand in stage 210, exemplary method 200 advances to stage 220 where a second result is produced from the conditional selection using the first operand, the second operand, a the third operand. In this case the operands may respectively include the second input interval upper-point, the first input interval upper-point, and the first input interval lower-point. For example, the conditional selection used to produce the second result may be accomplished by the stages 310 through 325 of exemplary method 300 as shown in FIG. 3 and described above with respect to stage 210. However, in stage 220, the second input interval upper-point, the first input interval upper-point, and the first input interval lower-point are respectively received as the first operand, the second operand, and the third operand. In addition, the second result may comprise the fourth operand of stage 325.

After the second result is produced from the conditional selection using the first operand, the second operand, and the third operand in stage 220, exemplary method 200 continues to stage 230 where a third result is produced from a conditional division using the first operand, the second operand, and the third operand. In this case the operands may respectively include the first result, the second input interval upper-point, and the second input interval lower-point. For example, the conditional division used to produce the third result may be accomplished by the stages of exemplary method 300 as shown in FIG. 3 and described below. The stages of method 300 are exemplary, and other methods, processes, or procedures may be used, implemented either in hardware or in software for example, without departing from the spirit of the invention.

FIG. 3 is a flow chart setting forth the general stages involved in an exemplary method for producing at least one of the third result and the fourth result from the conditional division using the first operand, the second operand, and the third operand. Exemplary method 300 begins at starting block 305 and proceeds to stage 310 where the first operand is received. For example, to produce the third result, the first operand may comprise the first result.

Once the first operand is received in stage 310, exemplary method 300 advances to stage 315 where the second operand is received. For example, to produce the third result, the second operand may comprise the second input interval upper-point. After the second operand is received in stage 315, exemplary method 300 continues to stage 320 where the third operand is received. For example, to produce the third result, the third operand may comprise the second input interval lower-point.

From stage 320 where the third operand is received, exemplary method 300 proceeds to stage 325 where a fourth operand is selected based upon a sign of the first operand. The fourth operand may be represented by first multiplexer output 130 of FIG. 1 and comprise either the second operand or the third operand. For example, if sign bit 125 comprises a digital "0", first multiplexer 120 may place the output of second operand register 110 on first multiplexer output 130. If sign bit 125 comprises a digital "1", however, first multiplexer 120 may place the output of third operand register 115 on first multiplexer output 130.

Once the fourth operand is selected in stage 325, exemplary method 300 advances to stage 330 where the first operand is divided by the fourth operand. For example divider core 135 may receive first multiplexer output 130, the output of first operand register 105, and rounding mode indicator 145. Divider core 135 may then generate the quotient of first multiplexer output 130 and the output of first operand register 105 as quotient result 140. Quotient result 140 may be generated in accordance with IEEE Std. 754 and may be rounded up or rounded down depending upon the status of rounding mode indicator 145. This rounding may be performed by divider core 135 or by other elements as described above with respect to FIG. 1. In addition, quotient result 140 may comprise a special value including the special cases involving quotients utilizing zero or infinity as described above with respect to FIGS. 4–7.

Furthermore, depending upon the status of rounding mode indicator 145 and upon sign bits 126 and 127, system 100 may provide plus infinity or minus infinity as the division result rather than quotient result 140. For example, if sign bit 126 of second operand register 110 indicates a negative sign and sign bit 127 of third operand register 115 indicates a positive sign, the output of logic gate 155 may produce a signal configured to cause second multiplexer 150 to place infinity input 160 on second multiplexer output 170. In addition, if rounding mode indicator 145 indicates the rounding down mode, inverter 165 may cause infinity input 160 to have a negative sign. Similarly, if rounding mode indicator 145 indicates the rounding up mode, inverter 165 may cause infinity input 160 to have a positive sign. If sign bits 126 and 127 comprise any combination other than negative and positive respectively, quotient result 140 may be placed on second multiplexer output 170 and provided as the output of system 100. After the first operand is divided by the fourth operand in stage 330, exemplary method 300 ends at stage 335.

From stage 230 where the third result is produced from a conditional division using the first operand, the second operand, and the third operand, exemplary method 200 proceeds to stage 240 where a fourth result is produced from the conditional division using the first operand, the second operand, and the third operand. In this case the operands may respectively include the second result, the second input interval lower-point, and the second input interval upper-point. For example, the conditional division used to produce the fourth result may be accomplished by the stages of exemplary method 300 as shown in FIG. 3 and described above with respect to stage 230. However, in stage 240, the second result, the second input interval lower-point, and the second input interval upper-point are respectively received as the first operand, the second operand, and the third operand.

Once the fourth result is produced from the conditional division using the first operand, the second operand, and the third operand in stage 240, exemplary method 200 advances to stage 250 where the output interval is produced including the output interval lower-point and the output interval upper-point. In this case the output interval lower-point may comprise the third result and the output interval upper-point may comprise the fourth result. After the output interval is produced in stage 250, exemplary method 200 ends at stage 260.

Other formats and bit patterns may be used to represent floating point operand formats without departing from the principles of the present invention. Also, floating point status information contained in the operands could easily be represented by other bit combinations (not shown) without departing from the principles of the present invention. For example, more or fewer bits could be used, a subset or superset of exemplary status bits could be used, or the most significant bits of an operand (or some other subset of bits) could be used to indicate floating point status information, instead of the least significant bits.

It will be appreciated that a system in accordance with an embodiment of the invention can be constructed in whole or in part from special purpose hardware or a general purpose computer system, or any combination thereof. Any portion of such a system may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for computing an output interval comprising:
   a component for producing a first result from a conditional selection using a first operand, a second operand, and a third operand, the operands respectively including a second input interval lower-point, a first input interval lower-point, and a first input interval upper-point;
   a component for producing a second result from the conditional selection using the first operand, the second operand, and the third operand, the operands respectively including a second input interval upper-point, the first input interval upper-point, and the first input interval lower-point;
   a component for producing a third result from a conditional division using the first operand, the second operand, and the third operand, the operands respectively including the first result, the second input interval upper-point, and the second input interval lower-point;
   a component for producing a fourth result from the conditional division using the first operand, the second operand, and the third operand, the operands respectively including the second result, the second input interval lower-point, and the second input interval upper-point; and
   a component for producing the output interval including an output interval lower-point and an output interval upper-point, the output interval lower-point comprising the third result and the output interval upper-point comprising the fourth result.

2. The system for computing the output interval of claim 1, wherein at least one of the third result and the fourth result is one of rounded up and rounded down.

3. The system for computing the output interval of claim 1, wherein the third result is rounded down and the fourth result is rounded up.

4. The system for computing the output interval of claim 1, wherein at least one of the first input interval lower-point, the first input interval upper-point, the second input interval lower-point, the second input interval upper-point, the output interval lower-point, and the output interval upper-point comprises a floating point number.

5. The system for computing the output interval of claim 1, wherein the result of the conditional division is the division of the first operand by the second operand if the sign of the first operand is positive and at least one of the sign of the second operand is positive and the sign of the third operand is negative.

6. The system for computing the output interval of claim 5, wherein the result of the conditional division comprises a special case value when at least one of the first operand and the second operand comprise at least one of $-\infty$, $+\infty$, $+0$, and $-0$.

7. The system for computing the output interval of claim 1, wherein the result of the conditional division is the division of the first operand by the third operand if the sign of the first operand is negative and at least one of the sign of the second operand is positive and the sign of the third operand is negative.

8. The system for computing the output interval of claim 7, wherein the result of the conditional division comprises a special case value when at least one of the first operand and the third operand comprise at least one of $-\infty$, $+\infty$, $+0$, and $-0$.

9. The system for computing the output interval of claim 1, wherein the component for producing at least one of the third result and the fourth result from the conditional division using the first operand, the second operand, and the third operand is further configured for:
   receiving the first operand;
   receiving the second operand;
   receiving the third operand;
   selecting a fourth operand based upon a sign of the first operand, the fourth operand comprising one of the second operand and the third operand; and
   dividing the first operand by the fourth operand.

10. The system for computing the output interval of claim 9, wherein dividing the first operand by the fourth operand further comprises rounding the result of the division based upon a rounding mode.

11. The system for computing the output interval of claim 10, wherein dividing the first operand by the fourth operand results in $-\infty$ if the sign of the second operand is negative, if the sign of the third operand is positive, and if the rounding mode comprises rounding down.

12. The system for computing the output interval of claim 10, wherein dividing the first operand by the fourth operand results in $+\infty$ if the sign of the second operand is negative, if the sign of the third operand is positive, and if the rounding mode comprises rounding up.

13. The system for computing the output interval of claim 1, wherein the component for producing at least one of the first result and the second result from the conditional selection using the first operand, the second operand, and the third operand is further configured for:
   receiving the first operand;
   receiving the second operand;
   receiving the third operand;
   selecting a fourth operand based upon a sign of the first operand, the fourth operand comprising one of the second operand and the third operand.

14. A computer-readable medium on which is stored a set of instructions for computing an output interval, which when executed perform stages comprising:
   producing a first result from a conditional selection using a first operand, a second operand, and a third operand, the operands respectively including a second input interval lower-point, a first input interval lower-point, and a first input interval upper-point;
   producing a second result from the conditional selection using the first operand, the second operand, and the third operand, the operands respectively including a second input interval upper-point, the first input interval upper-point, and the first input interval lower-point;
   producing a third result from a conditional division using the first operand, the second operand, and the third operand, the operands respectively including the first result, the second input interval upper-point, and the second input interval lower-point;
   producing a fourth result from the conditional division using the first operand, the second operand, and the third operand, the operands respectively including the second result, the second input interval lower-point, and the second input interval upper-point; and producing the output interval including an output interval lower-point and an output interval upper-point, the output interval lower-point comprising the third result and the output interval upper-point comprising the fourth result.

15. The computer-readable medium for computing the output interval of claim 14, wherein at least one of the third result and the fourth result is one of rounded up and rounded down.

16. The computer-readable medium for computing the output interval of claim 14, wherein the third result is rounded down and the fourth result is rounded up.

17. The computer-readable medium for computing the output interval of claim 14, wherein at least one of the first input interval lower-point, the first input interval upper-point, the second input interval lower-point, the second input interval upper-point, the output interval lower-point, and the output interval upper-point comprises a floating point number.

18. The computer-readable medium for computing the output interval of claim 14, wherein the result of the conditional division is the division of the first operand by the second operand if the sign of the first operand is positive and at least one of the sign of the second operand is positive and the sign of the third operand is negative.

19. The computer-readable medium for computing the output interval of claim 18, wherein the result of the conditional division comprises a special case value when at least one of the first operand and the second operand comprise at least one of $-\infty$, $+\infty$, $+0$, and $-0$.

20. The computer-readable medium for computing the output interval of claim 14, wherein the result of the conditional division is the division of the first operand by the third operand if the sign of the first operand is negative and at least one of the sign of the second operand is positive and the sign of the third operand is negative.

21. The computer-readable medium for computing the output interval of claim 20, wherein the result of the conditional division comprises a special case value when at least one of the first operand and the third operand comprise at least one of $-\infty$, $+\infty$, $+0$, and $-0$.

22. The computer-readable medium for computing the output interval of claim 14, wherein producing at least one of the third result and the fourth result from the conditional division using the first operand, the second operand, and the third operand further comprises:

receiving the first operand;

receiving the second operand;

receiving the third operand;

selecting a fourth operand based upon a sign of the first operand, the fourth operand comprising one of the second operand and the third operand; and dividing the first operand by the fourth operand.

23. The computer-readable medium for computing the output interval of claim 22, wherein dividing the first operand by the fourth operand further comprises rounding the result of the division based upon a rounding mode.

24. The computer-readable medium for computing the output interval of claim 23, wherein dividing the first operand by the fourth operand results in $-\infty$ if the sign of the second operand is negative, if the sign of the third operand is positive, and if the rounding mode comprises rounding down.

25. The computer-readable medium for computing the output interval of claim 23, wherein dividing the first operand by the fourth operand results in $+\infty$ if the sign of the second operand is negative, if the sign of the third operand is positive, and if the rounding mode comprises rounding up.

26. The computer-readable medium for computing the output interval of claim 14, wherein producing at least one of the first result and the second result from the conditional selection using the first operand, the second operand, and the third operand further comprises:

receiving the first operand;

receiving the second operand;

receiving the third operand;

selecting a fourth operand based upon a sign of the first operand, the fourth operand comprising one of the second operand and the third operand.

* * * * *